US012301425B2

(12) United States Patent
Hall et al.

(10) Patent No.: US 12,301,425 B2
(45) Date of Patent: May 13, 2025

(54) TRUST LABELING OF CALL GRAPHS FOR TELECOMMUNICATION NETWORK ACTIVITY DETECTION

(71) Applicant: AT&T Intellectual Property I, L.P., Atlanta, GA (US)

(72) Inventors: Elijah Hall, Plano, TX (US); Ana Armenta, San Jose, CA (US); Prince Paulraj, Coppell, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 291 days.

(21) Appl. No.: 17/892,569

(22) Filed: Aug. 22, 2022

(65) Prior Publication Data

US 2024/0064063 A1 Feb. 22, 2024

(51) Int. Cl.
*H04L 41/12* (2022.01)
*G06F 18/22* (2023.01)
*G06F 18/2411* (2023.01)

(52) U.S. Cl.
CPC .............. *H04L 41/12* (2013.01); *G06F 18/22* (2023.01); *G06F 18/2411* (2023.01)

(58) Field of Classification Search
CPC ......... H04L 41/12; H04L 41/16; G06F 18/22; G06F 18/2411; G06F 18/21; G06F 18/23; G06F 18/24
See application file for complete search history.

(56) References Cited

U.S. PATENT DOCUMENTS

| | | | | |
|---|---|---|---|---|
| 6,850,606 B2* | 2/2005 | Lawyer | ................ | H04M 15/58 |
| | | | | 379/114.03 |
| 10,303,875 B1* | 5/2019 | Saxe | ....................... | G06N 3/04 |
| 10,999,298 B2* | 5/2021 | Eisen | .................. | H04L 63/1483 |
| 11,178,068 B1* | 11/2021 | Etler | ..................... | H04L 47/826 |
| 11,310,360 B2* | 4/2022 | Hochberg | ............ | H04M 3/382 |
| 11,556,664 B2* | 1/2023 | Levy | ..................... | H04L 9/3265 |
| 2013/0303159 A1* | 11/2013 | Gathala | ............. | H04W 52/0209 |
| | | | | 455/425 |

(Continued)

OTHER PUBLICATIONS

Goyal, P., et al., "Graph Embedding Techniques, Applications, and Performance: A Survey", Knowledge Based Systems, Dec. 27, 2017, 18 pages, arXiv: 1705.02801v4.

(Continued)

*Primary Examiner* — Benjamin M Thieu

(57) ABSTRACT

A processing system may obtain a feature vector for a relationship between first and second user identities within a telecommunication network, the feature vector including: a first number of communications from the first user identity to the second user identity for a first communication channel, a first volume associated with the first number of communications, a second number of communications from the second user identity to the first user identity for the first communication channel, and a second volume associated with the second number of communications. The processing system may then calculate a scaled distance between the feature vector and a centroid comprising a mean vector of a set of relationships between user identities within the telecommunication network, where the scaled distance is associated to a trust value, and perform at least one remedial action in the telecommunication network based on the trust value.

20 Claims, 6 Drawing Sheets

(56) References Cited

U.S. PATENT DOCUMENTS

| | | | | |
|---|---|---|---|---|
| 2016/0103996 | A1* | 4/2016 | Salajegheh | G06F 21/316 |
| | | | | 726/25 |
| 2017/0046510 | A1* | 2/2017 | Chen | G06F 21/552 |
| 2017/0111515 | A1* | 4/2017 | Bandyopadhyay | |
| | | | | H04W 12/128 |

OTHER PUBLICATIONS

Kung-Hsiang., H., "A Gentle Introduction to Graph Neural Networks (Basics, DeepWalk, and GraphSage)." Towards Data Science, Feb. 10, 2019, accessed from https://towardsdatascience.com/a-gentle-introduction-to-graph-neural-network-basics-deepwalk-and-graphsage-db5d540d50b3, 10 pages.

Hamilton, W., et al., "Inductive Representation Learning on Large Graphs", 31$^{st}$ Conference on Neural Information Processing Systems, (NIPS 2017), 19 pages.

"Graph Embedding", Chapter 4, accessed on Nov. 22, 2021 from https://cse.msu.edu/~mayaod/dig_book/chapters/chapters.pdf, 32 pages.

\* cited by examiner

TRUST LABELING OF CALL GRAPHS FOR TELECOMMUNICATION NETWORK ACTIVITY DETECTION

The present disclosure relates generally to telecommunication network operations and machine learning model deployment, and more particularly to methods, computer-readable media, and apparatuses for performing at least one one remedial action in a telecommunication network based on a trust value calculated as a scaled distance between a feature vector for a relationship between two user identities and a centroid comprising a mean vector of a set of relationships.

BACKGROUND

Machine learning in computer science is the scientific study and process of creating algorithms based on data that perform a task without any specific instructions. These algorithms are called models and different types of models can be created based on the type of data that the model takes as input and also based on the type of task (e.g., prediction, classification, or clustering) that the model is trying to accomplish. The approach to machine learning involves using the training data to create the model, testing the model using the cross-validation and testing data, and then deploying the model to be used by real-world applications.

SUMMARY

In one example, the present disclosure describes a method, computer-readable medium, and apparatus for performing at least one remedial action in a telecommunication network based on a trust value calculated as a scaled distance between a feature vector for a relationship between two user identities and a centroid comprising a mean vector of a set of relationships. For instance, in one example, a processing system including at least one processor may obtain a feature vector for a relationship between a first user identity and a second user identity in a telecommunication network. In one example, the feature vector may include at least: a first number of communications from the first user identity to the second user identity for a first communication channel, a first volume associated with the first number of communications from the first user identity to the second user identity, a second number of communications from the second user identity to the first user identity for the first communication channel, and a second volume associated with the second number of communications from the second user identity to the first user identity. The processing system may next calculate a scaled distance between the feature vector and a centroid comprising a mean vector of a set of relationships between user identities within the telecommunication network, where the scaled distance is associated to a trust value. The processing system may then perform at least one remedial action in the telecommunication network based on the trust value, where the at least one remedial action is applied with respect to at least one communication involving the first user identity and the second user identity.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
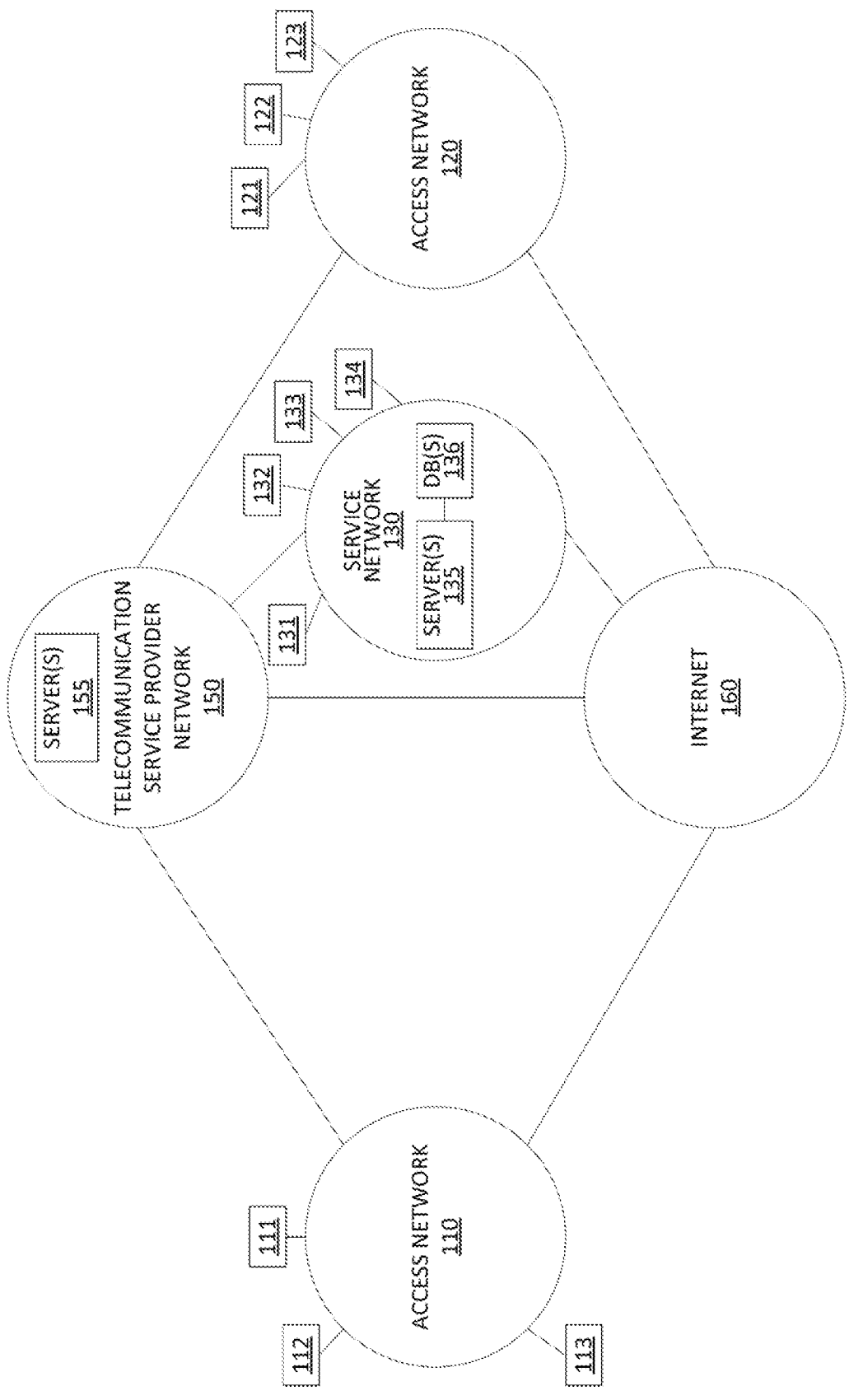
FIG. 1 illustrates one example of a system related to the present disclosure.

The present disclosure broadly discloses methods, non-transitory (i.e., tangible or physical) computer-readable storage media, and apparatuses for performing at least one remedial action in a telecommunication network based on a trust value calculated as a scaled distance between a feature vector for a relationship between two user identities and a centroid comprising a mean vector of a set of relationships. In particular, examples of the present disclosure relate to detecting user identities (e.g., phone numbers) having communications within a telecommunication network associated with a type of network activity. In one example, the present disclosure identifies and labels relationships between user identities with the concept of "trust." To illustrate, whether a relationship is "trusted" or "not trusted" (or a trust value assigned to the relationship, e.g., on a scale of 1 to 100, or the like) may be a factor in determining whether or not a caller is a robocaller, is associated with fraudulent activity in the network, and so forth. For instance, a trust label determined for a relationship may be a predictor in a machine learning-based detection process associated with robocalling, spoofing, and/or other fraudulent activities in the network for particular user identities (e.g., phone numbers) and/or for particular calls.

In accordance with the present disclosure, "trust" may be defined as a continuing relationship that can be qualified or quantified using metrics across one or more communication channels (e.g., phone calls and/or text messages). In a practical sense, knowledge of continued communication between two entities and an established pattern of behavior over time may facilitate identifying when a communication has been compromised or masked by a third party. In one example, the present disclosure uses a lookback of time T, with metrics collected over a duration of at least t. In accordance with the present disclosure, a relationship exists when there are reciprocal communications between user identities, e.g., where each user identity sends communications to and receives communications from the other. It should be noted that the term "user identity" as referred to herein may describe a phone number, but may also include an email address, a username or handle, a device identifier, an Internet Protocol address, or the like which may identify an entity. In this regard, a user identity may relate to an individual, but may also relate to an organization (e.g., one in which multiple members may share the use of a single identity for communications). In addition, it should be understood that the term "user identity" may also be associated with an automated system. For instance, a user may have a phone number (e.g., a calling telephone number (CTN)), International Mobile Equipment Identity (IMEI), email address, or the like that is assigned to the user. However, the user may permit or configure one or more automated systems to send and/or receive communications in accordance with these user identities. In addition, when a device or account is compromised, a malicious actor may configure the device and/or account to engage in robocalling, spam texting, spam emailing, or the like where the communications are essentially automated or are facilitated with only minimal human input.

In one example, the present disclosure generates a vector of features that defines the reciprocal or bi-directional communication traffic between two entities, $X=\{x1, \ldots, xn\}$. In one example, the present disclosure may store a record for each relationship that may include a plurality of features that define the relationship. In one example, all or a portion of such features may be used in connection with a features vector for determining whether the relationship is "trusted." In one example, the present disclosure may calculate a scaled distance, (e.g., a scaled Euclidean distance, such as a Mahalanobis distance, D) as the distance of the vector (e.g., a point in a multi-dimensional feature space) to a centroid of the data. For instance, in one example, the centroid may comprise a mean vector of a sample data set of vectors representing example relationships between pair of user identities. In another example, the centroid may comprise a null vector, as explained in further detail below. It should be noted that in one example, the present disclosure may aggregate traffic between two user identities from multiple channels to increase the n-dimensional space of X. In one example, the present disclosure may set one or more decision boundaries with respect to D using quantile values to consistently and agnostically set labels (e.g., "trusted"/"not trusted," high trust/medium trust/neutral/no trust, or the like). Alternatively, or in addition, the distance D may be used as a label of a trust score, or trust value (e.g., on a scale of 0 to 100, or the like).

In one example the present disclosure may use a machine learning algorithm for real-time and non-real time predictions for user identities and/or particular communications via one or more communication channels in accordance with the trust labels determined herein. In an illustrative example, using text message records and voice call records, the present disclosure may generate a distance, or trust value, to determine if a trusted relationship exists between two entities. In one example, a trust label (e.g., the trust value itself, or a label of "trusted"/"not trusted," or similar trust level) may be added to a record of relationship features (e.g., the vector of features, or a record that includes further features in addition to the features of the vector). In one example, a relationship may be further determined and labeled as text dominated, call dominated, sparse, dense, or some combinations thereof.

In one example, the present disclosure may use agnostic metrics that derive various levels of confidence with different values of T and t. In some use cases, such as robocalling, a phone number can be spoofed and call many untrusted numbers rapidly within a short time window. Using larger values for T and t will remove these from the consideration set to generate X. Once trusted relationships are established, such information may then be used to help discriminate from suspected fraudulent traffic, including spoofing, robocalling, and other behaviors. In addition, in technology industries with high data traffic between resources, telemetry data between any two entities may be monitored for similar identification of trusted versus untrusted relationships. With these relationships defined, events can also be automatically flagged for additional manual inspection or review. Alternatively, or in addition, in highly trusted networks, automated rules may also be defined in connection with determined trust labels.

In one example, the present disclosure may maintain data on communications via one or more channels and relationships between entities in a network graph, e.g., a relationship graph, for instance, a monopartite pseudo graph, G(V,E) where E is the set of all directed edges allowing for duplicates with different creation times such as (u,v,t) and (v,u,t). In one example, the present disclosure may reduce such a graph to a weighted simple monopartite graph G'(V',W) where the vertices V is a subset of V, and W is the set of all weights, e.g., (u,v,w) where w is the weight of that edge between u,v and is undirected. In accordance with the present disclosure, features of X ($X=\{x1, \ldots, xn\}$), are aggregated over a number of calls (e.g., all calls between two user identities, or "entities" within a time window, such as 30 days, 60 days, 90 days, or the like). In one example, the present disclosure may merge edges representing individual calls between two user identities to generate an aggregated edge (u,v,X), where X is the aggregated features to be used to define trust. In one example, the present disclosure may find the distance, D, to a centroid of the n-dimensional space of X (e.g., a mean vector or a null vector). In one example, the present disclosure determines a Mahalanobis distance, e.g., a scaled Euclidean distance. For instance, in one example, a covariance associated with X is used to scale the deviations from the centroid (e.g., a null vector or a mean vector) leading to a more reliable distance metric across multiple dimensions. To illustrate, in one example, the distance may be generated according to the following:

$$D_M(\vec{X}) = \sqrt{(\vec{X}-\vec{\mu})^T S^{-1} (\vec{X}-\vec{\mu})} \qquad \text{Equation 1}$$

In this example, $D_M(\vec{X})$ may be the Mahalanobis distance of X to the centroid $\mu$, where S is the covariance matrix, $S^{-1}$ is the inverse of the covariance matrix S, and where $(\vec{X}-\vec{\mu})^T$ is the transpose of $(\vec{X}-\vec{\mu})$.

In one example, it may be known or assumed that most relationships in a network are zero trust. Thus, trusted relationships are outliers. As such, in one example, a null vector for $\mu$ may approximate a theoretical, representative zero trust relationship (e.g., and also approximate a mean of all relationships in the network). In another example, a mean vector for p may be determined as a mean over all vectors for relationships of a given user identity, a sampled set of vectors for relationships of the user identity, or the like (e.g., a localized mean vector). In each case, the covariance matrix S may also be determined from a sample set of vectors. In one example, the sample set may be the same as a sample set that may be used to determine a mean vector (e.g., when a null vector is not used for $\mu$). In another example, a different sample set may be used for generating the covariance matrix S.

As mentioned above, in one example, the present disclosure may further relate to network graph representations of the data connecting call records, text message records (e.g., records for Short Message Service (SMS) and/or multimedia message service (MMS) messages), and/or account data (e.g., subscriber identity data). For instance, the present disclosure may generate a network graph relating to subscriber/user and activity in a telecommunication network. The scale of this data may easily exceed 100 GB per day. In addition, additional data formats may be generated from such a network graph for various use cases associated with fraud and threat activity on the telecommunication network, such as for robocalling detection and blocking, hotlist generation, fraud ring detection, spoofing detection, social engineering detection, and feature generation for use in other models.

In one example, the present disclosure may incorporate the approach of a trusted edge between two user identities (e.g., telephone numbers, or "customer telephone numbers" (CTNs)) which is an aggregated edge between two nodes that utilizes one or more defined thresholds to establish a "trusted" relationship between two CTNs. In addition, in one example, the concept of a trusted edge may be used to aggregate a large time window of behavioral data (e.g., calling and messaging data), allowing the network graph to condense a large amount of data into a fraction of the original size. In addition, trusted edges may be used to define or generate a sub-graph that serves as a base for a shorter time window of raw data (e.g., non-aggregated calling and/or messaging data) to then be added to the network graph for more time sensitive use cases. Once this data is combined, the present disclosure may further apply a graph embedding process to generate one or more vectors (e.g., "embeddings"), representing one or more portions/aspects of the network graph, and may further set labels for a given use case to make predictions (e.g., using one or more prediction models, such as machine learning models (MLMs), regression models, or the like). For instance, in the case of detecting social engineering calls, the present disclosure may utilize a set of known events (e.g., social engineering calls, normal calls, and/or unknown calls) to train a prediction model. In one example, embeddings or other features of the network graph (e.g., including at least trust labels) may be associated with known events/labels and used as training and/or testing input data for one or more prediction models for various prediction tasks. In one example, the present disclosure may include prediction models for prediction, or classification tasks. For instance, a prediction model may be trained to determine whether a user identity is associated with robocalling activity (or not). Alternatively, or in addition, a prediction model may be trained to predict whether a particular call is a robocall and/or a type of robocall (or robocaller) (e.g., a non-malicious robocall/robocaller, a malicious robocall/robocaller, etc.), a threat level of the robocall/robocaller (e.g., high, medium, low), and so forth. Examples of non-malicious robocalls may include a bank informing customers that monthly statements are now available for access, a city informing residents of a trash pickup schedule change, etc., a governmental agency sending out daily reminders of upcoming appointments for a next day, etc. In one example, the present disclosure may also generate sequences of behaviors that may lead to fraud events. These sequences can be extracted for prediction models to be trained for learning fraud behaviors. An example is a communication can be made in which a series of text messages are received/sent between a device of a malicious actor and a target device to retrieve personal information, obtain a one-time personal identification number (PIN), obtain password reset notification links used to take control of the victim's account, and so forth.

Many systems for telecommunication network fraud and threat detection utilize call detail records (CDRs) and similar data sets. Responsible personnel may perform various feature engineering procedures and pre-analysis for respective prediction models, rule-based threat detection, and so forth. This kind of repeated use can incur large processing costs in terms of time as well as compute resources. For instance, simple joins to evaluate multiple hop connections can be time consuming and expensive. In addition, there may be many versions of rolling aggregated tables for these types of features, adding to the time and complexity of feature processing. In contrast, examples of the present disclosure provide both a long-term and short-term perspective of connections between user identities, such as CTNs, held in memory so that many use cases and models can leverage these relationships and extract many other types of features as prediction model inputs that might otherwise be cost prohibitive (e.g., with regard to time, compute resources, and/or monetary costs). In addition, wider patterns that are traditionally harder to describe such as robocalling behaviors and how they evolve throughout the network, may be identified with greater ease and speed as compared to prior approaches, such as using table-based data sets. Advantageously, robocalling detection in real-time or near-real time may provide numerous benefits to customers and a network operator, such as saving customers from potential costly social engineering attacks, or blocking devices and accounts associated with robocalling or other threat activities to the network, thereby preventing additional customers from being affected and freeing network resources for other beneficial and non-malicious uses, and so forth.

In recent decades fraudulent activities across telecommunication networks, and cellular networks in particular, have increased. Often, an entire ring of individuals collaborates on the effort. Working together, these fraudsters can inflict much greater losses on victims. It is therefore important to identify such fraudulent behaviors and the associated fraud rings to reduce or prevent repeated fraud occurrences. Examples of the present disclosure detect, or help in detecting high risk phone calls, relationships, and sequences of activities. Using a call graph, examples of the present disclosure may identify potentially high risk phone calls, such as robocalls and/or spoofed-number calls, and may collect hot lists, identify fraud rings, and so forth. For instance, using a call graph for a given time range, CTN activity may be aggregated to identify behavioral patterns. With these patterns, the present disclosure may define a relationship between two CTNs numbers using historical call records. In addition, graph features may be quickly collected over communication records (e.g., CDRs or the like) in helping to identify useful statistics that may identify normal call behaviors on a given number (and conversely, that may be used to identify phone numbers that do not behave normally, e.g., outliers). These outliers can be classified for any number of network threat detection cases.

To illustrate, it has been observed that extremely low or excessively high usage occurs on known fraud-related phone numbers compared to non-fraud-related phone numbers for a period of time prior to an occurrence of a fraud event (e.g., 30-90 days, two weeks, etc.). In one example, metrics such as the number of calls in/out, minutes of talk time in/out, and the number of text messages in/out, or the like are stored as node and/or edge information in a communication graph, and may be used as features for evaluation, e.g., classification/prediction of threat activity regarding a particular communication and/or a particular phone number. In one example, a communication graph may be constructed to represent communications between a fraud-related phone number and other phone numbers that have occurred over a certain period of time. A hot-list of phone numbers in the graph may then serve as a "warning signal" when a customer walks into a retail store of the telecommunication network seeking account upgrades, a new phone or other endpoint devices, a change to the authorized user of an account or an addition of another authorized user, etc.

In one example, a given phone number, "A," may be of interest, and a communication sub-graph may be extracted for communications that occurred in the past 'N' days between A and a set of other numbers $B_i$ i∈N, where N may be 14 days, 30 days, 60 days, one month, two months, etc. Once the sub-graph is constructed, a further sub-graph may be extracted representing a set of numbers $B_j$ j∈N and j<=i, which represents high-risk phone numbers. This sub-graph may then be used for various purposes, such as detecting robocall-associated numbers and related behaviors, identifying calls that are high risk spoof events and alerting order fulfillment services when they align with significant account events, such as an upgrade or an account change (e.g., changing or adding an authorized user), identifying fraud rings and understanding their behaviors, alerting for sales of new or added mobile phone lines in an existing or newly established account, where a port-in number is specified (e.g., in the case where the customer is porting a number from another carrier), black-listing certain port-in numbers (or specifying elevated risks for such port-in numbers), alerting authorities about suspicious call messaging or other network activities, and so forth. These and other aspects of the present disclosure are discussed in greater detail below in connection with the examples of FIGS. 1-6.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing device or system, such as computing system 600 depicted in FIG. 6, and may be configured to host one or more centralized and/or distributed system components. For example, a first system component may comprise a database of assigned telephone numbers, a second system component may comprise a database of basic customer account information for all or a portion of the customers/subscribers of the telecommunication service provider network 150, a third system component may comprise a cellular network service home location register (HLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other system components may include, for example, a layer 3 router, a short message service (SMS) server, a voicemail server, a video-on-demand server, a server for network traffic analysis, and so forth. It should be noted that in one example, a system component may be hosted on a single server, while in another example, a system component may be hosted on multiple servers in a same or in different data centers or the like, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user devices (e.g., subscriber/customer devices) and/or one or more servers of one or more third parties, such as a credit bureau, a payment processing service (e.g., a credit card company), an email service provider, and so on.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide service network 130 functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth.

In the example of FIG. 1, service network 130 may include one or more servers 135 which may each comprise all or a portion of a computing device or processing system, such as computing system 600, and/or a hardware processor element 602 as described in connection with FIG. 6 below, specifically configured to perform various steps, functions, and/or operations for performing at least one one remedial action in a telecommunication network based on a trust value calculated as a scaled distance between a feature vector for a relationship between two user identities and a centroid comprising a mean vector of a set of relationships, as described herein. For example, one of the server(s) 135, or a plurality of servers 135 collectively, may perform operations in connection with the example process of graph generation/maintenance of FIG. 2 and/or the example method 500 of FIG. 5, or as otherwise described herein. In one example, the one or more of the servers 135 may comprise an artificial intelligence (AI)/machine learning (ML)-based service platform (e.g., a network-based and/or cloud-based service hosted on the hardware of servers 135).

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 6 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for performing at least one one remedial action in a telecommunication network based on a trust value calculated as a scaled distance between a feature vector for a relationship between two user identities and a centroid comprising a mean vector of a set of relationships, as described herein. As just one example, DB(s) 136 may be configured to receive and store network operational data collected from the telecommunication service provider network 150, such as call logs, mobile device location data, control plane signaling and/or session management messages, data traffic volume records, call detail records (CDRs), message detail records (e.g., regarding SMS or MMS messages), error reports, network impairment records, performance logs, alarm data, and other information and statistics, which may then be compiled and processed, e.g., normalized, transformed, tagged, etc., and forwarded to DB(s) 136, via one or more of the servers 135. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

In one example, DB(s) 136 may be configured to receive and store records from customer, user, and/or subscriber interactions, e.g., with customer facing automated systems and/or personnel of a telecommunication network service provider (e.g., the operator of telecommunication service provider network 150). For instance, DB(s) 136 may maintain call logs and information relating to customer communications which may be handled by customer agents via one or more of the devices 131-134. For instance, the communications may comprise voice calls, online chats, emails, etc., and may be received by customer agents at devices 131-134 from one or more of devices 111-113, 121-123, etc. The records may include the times of such communications, the start and end times and/or durations of such communications, the touchpoints traversed in a customer service flow, results of customer surveys following such communications, any items or services purchased, the number of communications from each user, the type(s) of device(s) from which such communications are initiated, the phone number(s), IP address(es), etc. associated with the customer communications, the issue or issues for which each communication was made, etc. Alternatively, or in addition, any one or more of devices 131-134 may comprise an interactive voice response system (IVR) system, a web server providing automated customer service functions to subscribers, etc. In such case, DB(s) 136 may similarly maintain records of customer, user, and/or subscriber interactions with such automated systems. The records may be of the same or a similar nature as any records that may be stored regarding communications that are handled by a live agent.

Similarly, any one or more of devices 131-134 may comprise a device deployed at a retail location that may service live/in-person customers. In such case, the one or more devices 131-134 may generate records that may be forwarded and stored by DB(s) 136. The records may comprise purchase data, information entered by employees regarding inventory, customer interactions, surveys responses, the nature of customer visits, etc., coupons, promotions, or discounts utilized, and so forth. In this regard, any one or more of devices 111-113 or 121-123 may comprise a device deployed at a retail location that may service live/in-person customers and that may generate and forward customer interaction records to DB(s) 136. For instance, such a device (e.g., a "personnel device") may comprise a tablet computer in which a retail sales associate may input information regarding a customer and details of the transaction, such as identity and contact information provided by the customer (e.g., a name, phone number, email address, mailing address, etc.), desired items (e.g., physical items, such as smart phones, phone cases, routers, tablet computers, laptop computers, etc., or service items, such as a new subscription or a subscription renewal, a type of subscription (e.g., prepaid, non-prepaid, etc.), an agreement duration (e.g., a one-year contract, a two-year contract, etc.), add-on services (such as additional data allowances, international calling plans, and so forth), discounts to be applied (such as free phone upgrades and/or subsidized phone upgrades, special group discounts, etc.), and so on. In such case, information entered and/or obtained via such personnel devices may be forwarded to server(s) 135 and/or DB(s) 136 for processing and/or storage. As such, DB(s) 136, and/or server(s) 135 in conjunction with DB(s) 136, may comprise a retail inventory management knowledge base. In addition, DB(s) 136 and/or server(s) 135 in conjunction with DB(s) 136 may comprise an account management system. For instance, information regarding subscribers' online and in-store activities may also be included in subscriber account records (e.g., in addition to contact information, payment information, information on current subscriptions, authorized users, duration of contract, etc.).

In one example, DB(s) 136 may alternatively or additionally receive and store data from one or more third parties. For example, one or more of endpoint devices 111-113 and/or 121-123 may represent a server, or servers, of a consumer credit entity (e.g., a credit bureau, a credit card company, etc.), a merchant, or the like. In such an example, DB(s) 136 may obtain one or more data sets/data feeds comprising information such as: consumer credit scores, credit reports, purchasing information and/or credit card payment information, credit card usage location information, and so forth. In one example, one or more of endpoint devices 111-113 and/or 121-123 may represent a server, or servers, of an email service provider, from which DB(s) 136 may obtain email address service information (e.g., high-level information, such as the date that the email address was created and/or an age or approximate age of the email address since it was created, a mailing address and/or phone number (if any) that is associated with the email address (and if the third party is permitted to provide such information in accordance with the email address owner's permissions). Such information may then be leveraged in connection with email addresses that may be provided by customers during in-person transactions at telecommunication network service provider retail locations. Similarly, one or more of the endpoint devices 111-113 and/or 121-123 may represent a server, or servers, of one or more merchants or other entities (such as entities providing ticketed sporting events and/or concerts, email mailing lists, etc.), from which DB(s) 136 may obtain additional email address information (e.g., email address utilization information).

In one example, DB(s) 136 may store a communication graph (which may also be referred to as a network graph, or relationship graph in the present context) in which nodes represent user identities (e.g., phone numbers) and edges between the nodes represent communications/relationships between respective pairs of phone numbers during a given time period (such as two weeks, 30 days, one month, 60 days, two months, 90 days, etc.). In one example, the edges may comprise aggregated edges or may represent multiple communications between respective pairs of phone numbers during the time period. For instance, phone numbers A and B may have several calls within the last 30 days, which may be represented by a single edge. In addition, the edges may be weighted edges and may include various additional data, such as a number of calls, the number of calls initiated by A, the number of calls initiated by B, the average call duration (or average call durations for calls from A to B and calls from B to A, respectively), and so forth. In one example, the edges may also represent messages, e.g., SMS/text messages, MMS messages, or the like, between pairs of phone numbers. For instance, an edge may also include data regarding a number of messages exchanged between phone numbers A and B during the time period, the number of messages from A to B and from B to A, respectively, the average message size (e.g., in terms of data size, such as the number of bytes or the like, or in terms of a number of characters, etc.), an average inter-message interval, and so forth. It should be noted that the edges may also represent communications between two phone numbers that are both participants in one or more multi-party calls or multi-party messages. In addition, the edges may indicate a number of multi-party messages and/or multi-party calls that are initiated by respective ones of the phone numbers A and B, and those in which the phone numbers A and B are merely recipients/participants. In one example, edges may represent other types of communications, e.g., other communication channels, such as email messages, chat applications, video call applications, messages via a social network platform, etc. so long as each can be tied to a same user identity. In accordance with the present disclosure, the edges may also include, or may be updated to include trust labels, as described herein.

Each node may also include additional information regarding a phone number, such as an account number, the date an account was opened and/or an age of the account, an account holder name, an account mailing address, and so forth. Alternatively, or in addition, the communication graph may comprise a sub-graph of a k-partite/multi-partite graph in which at least one additional sub-graph may relate to account information (e.g., an "identity graph"). For instance, the communication graph may incorporate data from subscriber account records such as described above. In one example, the edges may also include "short-term" edges. For instance, aggregated edges or edges representing aggregated call and/or messaging data between respective pairs of phone numbers may store long-term perspective information (e.g., for a past two weeks, 30 days, 60 days, etc.). However, short-term perspective edges may comprise edges representing individual calls and/or messages within a shorter time period, e.g., within a past 24 or 48 hours, or the like. Thus, the communication graph may efficiently store and represent a long-term perspective of relationships between phone numbers, while also providing a short-term perspective on calls and/or messages at an individual communication level. It should be noted that these edges representing individual calls and/or messages may also be weighted and contain additional data, such as a type of communication (e.g., call or message), an initiator of the communication (e.g., phone number A or phone number B associated with the nodes connected by the edge), a duration of the call or size of the message, and so forth.

In one example, DB(s) 136 may store various prediction models (e.g., AI/ML-based prediction models) for various tasks. For instance, a prediction model may be trained to determine whether a telephone number is associated with robocalling activity (or not). Alternatively, or in addition, a prediction model may be trained to predict whether a particular call is a robocall and/or a type of robocall (or robocaller) (e.g., a non-malicious robocall/robocaller, a malicious robocall/robocaller, etc.), a threat level of the robocall/robocaller (e.g., high, medium, low), and so forth.

It should be noted that as referred to herein, a prediction model may include a machine learning model (MLM) (or machine learning-based model), e.g., a machine learning algorithm (MLA) that has been "trained" or configured in accordance with input data (e.g., training data) to perform a particular service, e.g., to detect whether a phone number is or is not associated with robocalling activity, to identify/predict whether a particular communication is or is not a robocall, to classify a category or robocaller or type of robocall (e.g., beneficial, benign, malicious, or similar categorizations), to classify a risk/threat level of a robocaller or a particular robocall (e.g., high, medium, low risk), etc., to detect fraud and/or to provide a fraud indicator, or value indicative of a likelihood of fraud, to detect spoofed number calling, and so forth. Examples of the present disclosure may incorporate various types of MLAs/models that utilize training data, such as support vector machines (SVMs), e.g., linear or non-linear binary classifiers, multi-class classifiers, deep learning algorithms/models, such as deep learning neural networks or deep neural networks (DNNs), generative adversarial networks (GANs), decision tree algorithms/models, k-nearest neighbor (KNN) clustering algorithms/models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. In one example, a robocalling classification, fraud detection, or other MLMs of the present disclosure may be in accordance with a MLA/MLM from an open source library, such as OpenCV, which may be further enhanced with domain specific training data. In an illustrative example, a robocalling detection MLM or fraud detection MLM of the present disclosure may comprise a gradient boosted machine (GBM).

In one example, DB(s) 136 may also store training data and/or testing data that may be used to train and verify the accuracy of a prediction model for robocalling detection and/or classification, for fraud detection, and so forth (broadly, a "network activity detection machine learning model") as described herein. For instance, server(s) 135 may apply a graph embedding process (e.g., graph2vec, or the like) to the communication graph to extract one or more vectors, or "embeddings," which may represent the graph overall or at least a portion of the communication graph (e.g., a sub-graph relating to a given node associated with a particular phone number and two or three hops away from the phone number). Various vectors/embeddings may then be used as training data for training a prediction model.

It should be noted that in one example, a prediction model may take an embedding/vector as input(s). In one example, the prediction model may also take the graph itself, a sub-graph thereof, or one or more features extracted directly from the graph or derived from the graph, as an additional input or inputs. In such case, a "set of input factors" may include an embedding/vector and the graph (or sub-graph), or other features extracted/derived therefrom. In addition, labels may be added to at least a portion of a plurality of sets of input factors (e.g., labels of "robocaller" or "not robocaller" (and/or "unknown," labels of "not robocaller," "beneficial robocaller," "malicious robocaller," etc., labels of "fraud" or "no fraud") as stored in DB(s) 136. In one example, the graph embedding process is learned/trained as part of the prediction model (e.g., where the extracted graph features and/or dimensionality of the vector(s)/embedding(s) is optimized for the specific task of the prediction model) or is trained as a separate process from the prediction model (e.g., guided graph embedding, where dimensionality of vector(s) and/or other hyperparameters is/are provided. Alternatively, dimensionality may be based upon selected loss criteria (e.g., an allowable level/percentage of loss of information)).

Operations of server(s) 135 for performing at least one one remedial action in a telecommunication network based on a trust value calculated as a scaled distance between a feature vector for a relationship between two user identities and a centroid comprising a mean vector of a set of relationships, and/or server(s) 135 in conjunction with one or more other devices or systems (such as DB(s) 136) are further described below in connection with the examples of FIGS. 2-6. In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth.

In addition, it should be understood that other aspects of the system 100 may be omitted from illustration in FIG. 1. As just one example, the system 100 may include a data distribution platform such as Apache Kafka, or the like, for obtaining sets/streams of data from telecommunication network service provider data source(s) (e.g., server(s) 155, devices 131-134, or the like) and third party data source(s) (e.g., endpoint devices 111-113, endpoint devices 121-123, or the like). The system 100 may also incorporate in-stream processing, such as preprocessing of raw data for ingestion into a graph/graph database stored by DB(s) 136 and/or for input into a prediction model via server(s) 135. For example, the server(s) 135 and/or DB(s) 136, as well as upstream data sources, may be deployed on one or more instances of Apache Flink, or the like, as part of and/or in association with the Kafka streaming platform. In addition, the prediction model(s), the graph embedding processes, and so forth may be trained within and/or may operate on such a platform. For instance, the server(s) 135 and/or DB(s) 136 may comprise an instance of Apache Spark, e.g., on top of Hive and Hadoop Distributed File System (HDFS), or similar arrangement. Thus, these and other aspects are all contemplated within the scope of the present disclosure.

Figure 2:
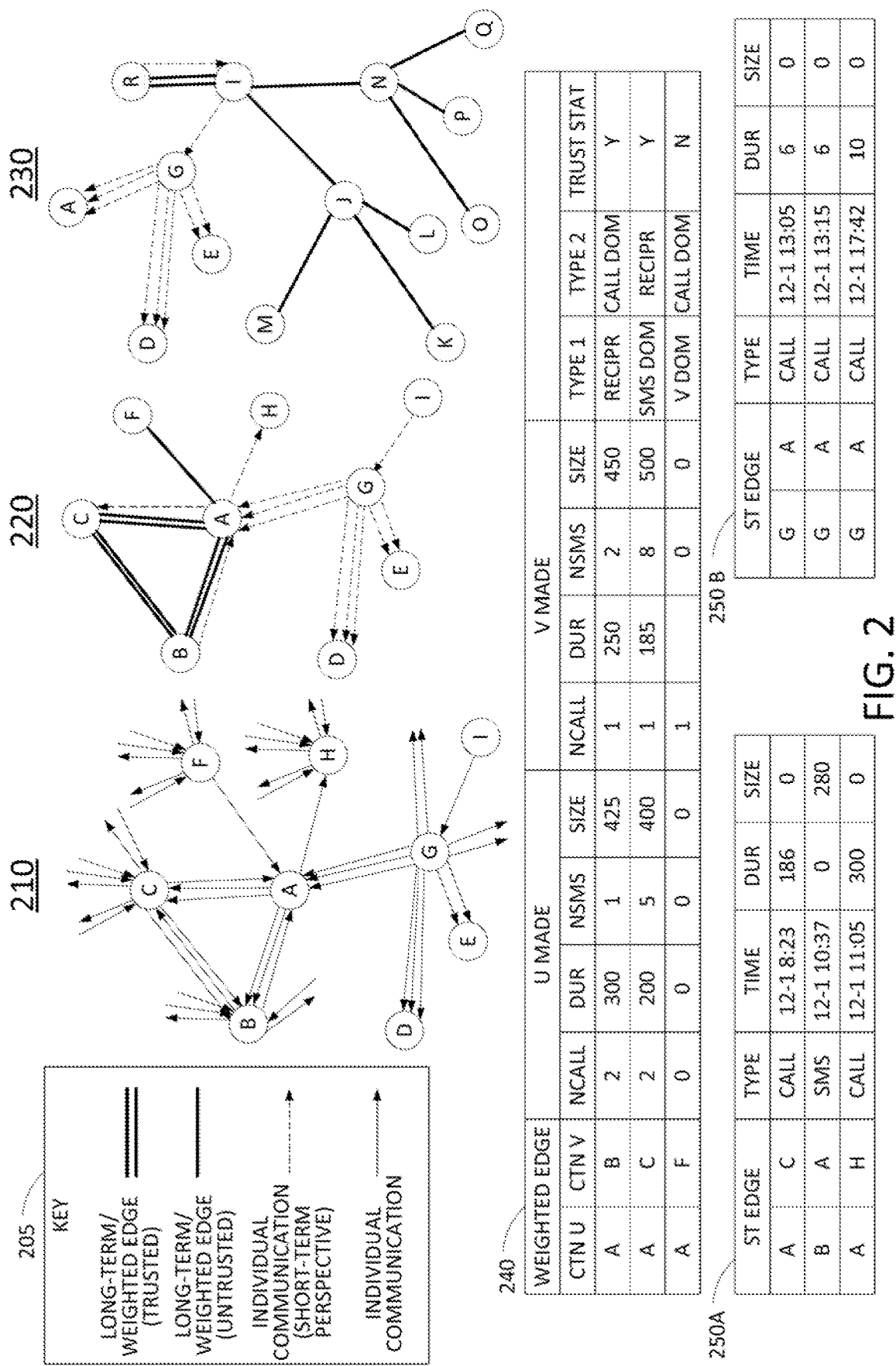
FIG. 2 illustrates an example of constructing a communication graph with long-term and short-term perspectives, and example edge information records, in accordance with the present disclosure.

FIG. 2 illustrates an example of constructing a communication graph with long-term and short-term perspectives, and example edge information records, in accordance with the present disclosure. In one example, the construction and maintenance of the communication graph and the storage of the communication graph may be implemented via a processing system comprising one or more physical devices and/or components thereof, such as a server or a plurality of servers, a database system, and so forth. For instance, various aspects of the example(s) of FIG. 2 may be provided via components as illustrated FIG. 1, such as server(s) 135 and/or DB(s) 136, or the like.

In one example, graph 210 may comprise a k-partite pseudograph, G(V,E), where E is the set of all directed edges allowing for duplicates with different creation times, such as (u,v,t) and (v,u,t). Graph 220 may comprise a reduction of the graph 210 to a weighted simple monopartite graph G'(V',M), where the vertices V is a subset of V and M is a set of aggregated edges. For instance, each aggregated edge may be represented as (u,v,m), where m is the multiplicity of that edge between u and v and is undirected. In one example, the edge may be further represented as (u,v,m,n,o,p,r,s) where (m,n,o,p,r,s) are aggregated features that are used to additionally define the relationship between u and v.

For instance, table 240 illustrates several examples of aggregated edges, e.g., between nodes/vertices A and B, between A and C, and between A and F. In each case, the aggregated edges are defined by the nodes/vertices (e.g., representing respective telephone numbers/CTNs) and additional features (e.g., (m, n, o, p, r, s, . . . )) such as a number of calls made by each CTN to the other CTN ("ncall"), an average duration and/or a total duration of such calls ("dur"), a number of messages sent by each CTN to the other CTN ("nsms"), an average message size and/or a total data volume of all of the messages ("size"), etc. In one example, the additional features may include the top two predominant types to define the relationship, which may be selected from among a defined set of possible types, such as reciprocal ("recipr"), which is characterized by a relative balance between communications from u to v and from v to u, "v dominant" ("v dom"), which is characterized as the communications being predominantly from v to u (and similarly for "u dominant" or ("u dom"), call dominant ("call dom")), which is characterized by the communications being predominantly calls (e.g., as opposed to text messages), and similarly for "text dominant" (or "SMS dom"), and so forth.

It should be noted that the graph 210 illustrates one-hop communications from node A, (e.g., a node representing telephone number A) to nodes B, C, F, G, and H (e.g., representing telephone numbers B, C, F, G, and H). In addition, some (but not all) second-hop nodes/telephone numbers are illustrated in the graph 210, such as nodes/telephone numbers D, E, and I. Other second-hop nodes/telephone numbers such as those representing communications with nodes/telephone numbers B, C, F, and H are omitted from the example of FIG. 2 for ease of illustration. In addition, it should be noted that a limited number of edges representing a limited number of individual communications between telephone numbers are illustrated in the graph 210. For instance, only three edges representing three communications between telephone number A (node A) and telephone number C (node C) are illustrated in the graph 210. However, it should be understood that in a time period of interest, such as 30 days, 60 days, etc., there may be many more communications between telephone numbers, especially when there is a trusted relationship, such as communications between close family members. In one example, the present disclosure may maintain a larger communication graph for numerous phone numbers of subscribers and/or non-subscribers of a telecommunication network, such as for all phone numbers sharing a particular area code, phone numbers sharing a same NPA-NXX, phone numbers associated with accounts in a particular state, or the like, and so forth (where multiple graphs may be maintained for different groupings), or even for an entire subscriber base. For instance, in one example, graph 210 may represent a subgraph of a much larger graph.

Graph 220 illustrates that some of the edges in graph 210 are aggregated into and represented by aggregated edges (illustrated as solid lines in graph 220). Notably, these aggregated edges may maintain a long-term perspective of phone number-to-phone number communications and relationships, e.g., over 2 weeks, 30 days, 60 days, etc. Additional information defining aggregated edges are illustrated in table 240 and described above.

In addition, some of the aggregated edges may further be defined as "trusted edges," illustrated by double solid lines in graph 220. For instance, a relationship between two phone numbers may be designated as "trusted" when a scaled distance between a feature vector for a relationship between the two phone numbers and a centroid comprising a mean vector of a set of relationships in the network (e.g., a calculated mean vector or a null vector approximating the same) exceeds a threshold. Thus, in any case, some edges/relationships may be designated as trusted, while others are not. For instance, A, B, and C may be family members with numerous communications and may thus have "trusted edges" between nodes A and B, B and C, and A and C.

Notably, an aggregated edge is shown between A and F, but this is not trusted. For example, sometime in the past 30 days, a doctor may have used telephone number F to call telephone number A to confirm an upcoming scheduled annual physical exam. Graph 220 also includes edges providing a short-term perspective of relevant communications, e.g., a past hour, a past 24 hours, a past 48 hours, or the like. For instance, the dotted lines in graph 220 may represent individual communication and are directed edges. Tables 250A and 250B, for example, illustrates edge data for individual communications to and from phone number A (node A) for the given short-term time period (e.g., a past 24 hours, or the like). For instance, the edge data may include a type of communication (e.g., call or text/SMS message), and a duration (if a call) or a size (e.g., a data size/volume, if a text message). Notably, the edge data for each edge may comprise features that may be used as a feature vector for trust determination, as described herein. In accordance with the present disclosure, table 240 may also include a trust status in the edge data (e.g., in addition to features that may be used in a feature vector for trust determination). In the present example, the trust status may comprise a label of Y/N (e.g., trusted/not trusted). However, in other, further, and different examples, trust status may be defined on a different scale, such as labels that may take values from 0 to 5, 0 to 100, etc. For instance, in one example a scaled distance (e.g., calculated per Equation 1 above, or the like) may be considered a trust value/score and may be included in the "trust stat" field in table 240. Notably, table 250B illustrates three short duration calls from telephone number G to telephone number A, all between 1:00 PM and 6:00 PM on December 1, which may be indicative of robocalling, especially in the absence of a trusted relationship or any other communications between A and G.

It should be noted that the data source(s) for the initial graph 210 may comprise call detail records (CDRs) of a telecommunication network. In one example, CDRs may be collected and/or maintained in separate databases for voice calls and for other messages (MMS or SMS). For a particular telecommunication network, these data sources may include CDRs for calls originated and/or terminated with phone numbers of subscribers/customers of the telecommunication network. For example, the daily call volume may exceed 2 billion calls and the daily message volume may exceed three billion messages per day for more than 200 million unique phone numbers. The total data size/volume of such records may exceed 120 GB in compressed parquet format. This means an average month of data may comprise approximately 3.6 TB. Simple aggregations in a data cluster (such as Apache Spark, or the like) may be possible via multiple joins. However, it could take days to perform such processing. Additionally, it may be desirable to join additional data sets for additional features for use in prediction models, such as account numbers to generate account level features, higher level relationships, e.g., account-to-account relationships, which can inform lower level relationships phone number-to-phone number, and so forth. Since accounts change, some data cleaning/screening filters and parameters may therefore need to be set when using larger windows of behavior. For instance, if accounts change, then a network operator may use the activation date as a dynamic filter for aggregation. Thus, adding additional data sources further increases the complexity of preparing data for input to prediction models.

In contrast, with an aggregated graph, such as graph 220 of FIG. 2, the size/volume of stored data is drastically reduced. This allows a network operator to hold much longer time ranges of data and overlay recent events such as the last hour of calls, the last 24 hours of calls, or the like. In one example, the short-term edges are non-weighted. In one example, this recent activity may be compared to historical trends for signal detection. In addition, with enough data, these signals can be used to train a prediction model (or may be used as additional input features for model training and live predictions/classifications, or the like).

In one example, graph embeddings may also be generated from the aggregated graph 220, also referred to as a weighted network graph, to generate additional features. For instance, the graph 220 is similar to language knowledge graphs in that each phone number is analogous to a word, and the order, frequency, and count of unique nodes in a subgraph are important information that are captured in the embedding space. Thus, in one example, each phone number may be treated as a word. In addition, examples of the present disclosure may use graph2vec or other embedding techniques to generate unique embeddings/vectors. In one example, the embeddings/vectors may also be merged with the features on the weighted graph (e.g., graph 220) as complementary inputs to a prediction model, such as for robocalling detection, fraud detection, or the like. It is again noted that the present examples build a long-term perspective, while using a short-term perspective to generate additional features, and additionally generate derived features, such as graph embeddings.

To further illustrate, in one example, using any or all of these features, a prediction model may be trained and deployed to classify a phone number with respect to robocalling. For instance, there may be two main objectives for robocalling detection: to identify the phone numbers that are likely robocallers and to detect the call events themselves. In accordance with the present disclosure, trusted relationships between telephone numbers are indicated in the edge data, where such a relationship exits. Conceptually robocallers mostly have outgoing calls and little or no incoming calls. In addition, if trust is defined as a reciprocal relationship, then robocallers have little or no calls with other phone numbers in a trusted relationship.

In one example, features that are used for robocalling detection may include short-term features (e.g., one day features), such as outgoing call count, incoming call count, and/or incoming/outgoing call ratio. Features that are used for robocalling detection may also include long-term features (e.g., features aggregated over 30-day or 60-day time periods, or the like), such as (for each relationship in the graph) the identities of the parties, the number of calls, the average call duration and/or overall time on calls, a number of messages, an average message size and/or total message data size/volume, and an indication of whether the relationship is trusted or untrusted. For instance, for a given phone number that is being evaluated for robocaller/not robocaller categorization, the long-term features may be collected with respect to at least the edges/relationships/communications of the given phone number with other phone numbers. The features that are used for robocalling detection may also include combined features derived from a graph (such as graph 220), such as: trusted outgoing call count, untrusted outgoing call count, and/or trusted/untrusted call (or messaging) ratio(s).

In one example, some or all of the features for robocalling detection may be obtained from a graph embedding process, such as discussed above. In other words, the above features may comprise a vector or "embedding" derived from graph 220. Alternatively, or in addition, features may be extracted from graph 220 itself. For instance, a vector/embedding may be derived for long-term features, while short term features may be extracted from edges in the graph 220 via node traversal, or the like.

In one example, using any or all of these features, a prediction model may be trained and deployed to classify a phone number with respect to robocalling across two perspectives: call volume and risk. For instance, "risk" in the present context may be defined as a ratio of new calls made to phone numbers where no standing relationship exists (e.g., "cold calls"). For instance "risk" may be a function of overall outgoing call count, outgoing trusted call count, and incoming call count for a subject telephone number. In one example, each "perspective," or robocalling categorization, may have three levels, giving a label with nine distinct values, e.g., High_High to Low_Low.

Figure 3:
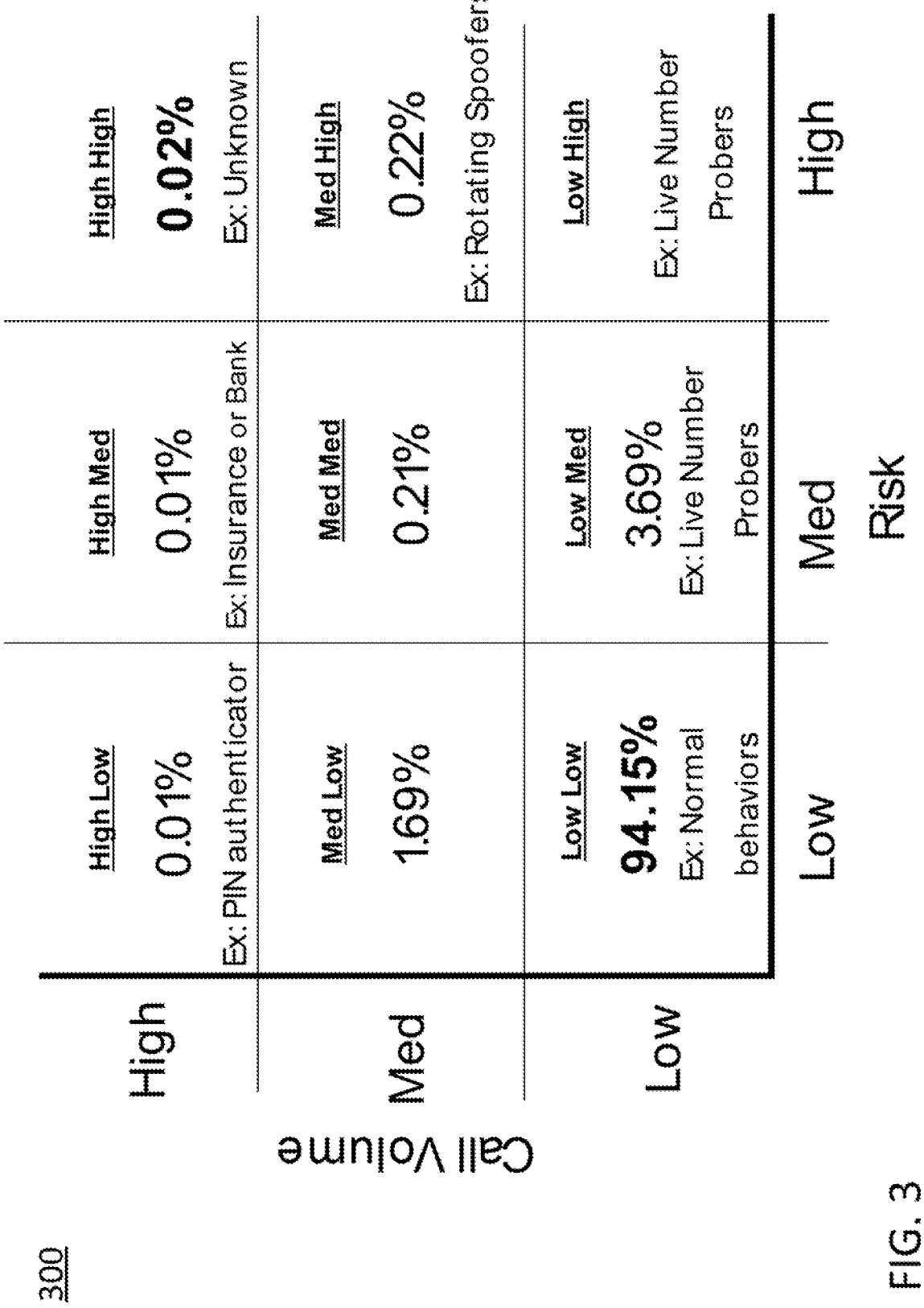
FIG. 3 illustrates an example of robocalling label descriptions, in accordance with the present disclosure.

To illustrate, FIG. 3 depicts an example of robocalling label descriptions 300. FIG. 3 also provides an example percentage distribution of telephone numbers by label type, and some examples of behaviors or caller types for each category. For instance, a high volume caller with low risk may be a personal identification number (PIN) authenticator service that places a high volume of calls (e.g., each time a user with two-factor authentication seeks to access the service, an automated call may be made to a user's telephone number (or similarly a text message)). As another example, a medium risk-high volume caller may be an insurance company or a bank that may place automated calls with monthly reminders of statement availability, balances due, billing due dates, etc. Other labels/categories may be associated with live number probers (malicious actors calling phone numbers just to see if a live person will answer; those having live answers may then be added to a list for further fraudulent activities) or rotating spoofers (e.g., malicious actors who spoof legitimate phone numbers and place a moderate volume of calls and/or messages before moving on to a next phone number to spoof). Using these labels on a communication graph, such as graph 210, the calls themselves can also be labeled as robocall/not robocall, and/or a particular category of robocalling.

It should be noted that the foregoing is just one example of how robocalling categories/labels may be defined and that in other, further, and different examples, more or less factors, different factors, and so forth may be used as the basis for defining risk, for example, for defining the cutoffs between "high," "medium," and "low" call volumes, and so on. For instance, additional features may include a ratio of a number of calls to a number of answered calls, a number of calling minutes versus outgoing trusted calls ratio, a trusted edge count, a repeat call count, a number of unique phone numbers contacted, a median inter-call duration, a count of unique area codes called, a percentage of call to a predominant area code (the area code to which a given phone number places the most calls), a clique size (e.g., a number of strongly connected nodes on the graph to which a given node/telephone number belongs), and so forth.

It should also be noted that in one example, features for more than one hop may be included in a vector/embedding as additional features from the graph are used for robocalling categorization, such as, for telephone numbers having a direct relationship with a given/subject phone number, features associated with relationships with other telephone numbers, etc. For instance, for a subject phone number G in graph 220, there may be a direct relationship with A. In addition, features may be derived from relationships between A and B, C, F, and/or H. As just one example, additional features may include a mean/average neighbor outgoing call count and/or a maximum neighbor outgoing call count (e.g., for one-degree neighbors of outgoing calls from a subject telephone number). For instance, with respect to the example of graph 220, if a subject telephone number is G, these additional metrics may include average and/or maximum outgoing calls counts for A, D, E, and I.

As an additional example, a prediction model may be trained for and deployed to categorize individual calls with respect to robocalling (e.g., is the call likely/not likely a robocall, a percentage likelihood or likelihood score of being a robocall, a suspected category of robocalling (e.g., such as selected from among the categories/labels of the example of FIG. 3), or the like). For instance, one of the edges in graph 220 between G and A may be evaluated for robocalling categorization via such a prediction model. The inputs to the model may be of the same or similar nature as discussed above, and may include one or more vector(s)/embedding(s) and/or features from the graph itself (e.g., without embedding).

As still another example, graph 230 illustrates an additional graph with long and short-term perspectives representing at least a portion of communications/relationships among telephone numbers associated with a telecommunication network. In one example, graph 230 may at least partially overlap with graph 220. For instance, graphs 220 and 230 may represent respective sub-graphs of a larger communication graph (e.g., graph 220 having a subject node A, and graph 230 having a subject node I). Notably, graph 230 may be used in evaluating node I with respect to robocalling or other fraudulent activities. In this case, graph 230 visually indicates from a long-term perspective that phone number I has relationships with phone numbers J and N, and a trusted relationship with node R, and from a short-term perspective that phone number I has had a recent call to node G and a recent call from node R. In this case, G may be a phone number that is used for robocalling (e.g., phone number G being the same as illustrated in graph 220). Notably, while phone number I is not used directly for robocalling, it may be associated with robocalling activity, such as being used as a command and control system for endpoint devices that are used for robocalling. For instance, nodes J and N may represent phone numbers J and N that were also used by a same person or entity for robocalling within the last 30 days. In this case, a graph embedding representing node I may pull-in data from one or two hops from node I, capturing these long-term features. In addition, additional features from one or two hops from the graph 230 may capture short term activities of node G that are indicative of robocalling. For instance, with respect to the example of graph 230, assuming the subject telephone number is I, these additional metrics may include average and maximum outgoing calls counts for G, J, and N. All of these features may be input to a prediction model, e.g., a gradient boosted machine (GBM) or the like, that is trained to categorize I with respect to whether the phone number is associated with robocalling activity.

This structured call graph framework can be expanded for additional use cases and prediction models. In any case, examples of the present disclosure provide faster access to these multiple sources of data, e.g., call and message records. In one example, data maintenance may all be in graph form, or in a combination using pipelines and a distributed data platform (such as Apache Spark) to aggregate raw data before ingestion into the graph. However once in a communication graph (which may also be referred to as a graph database), additional derived features, such as embeddings/vectors, may be efficiently generated and used in real-time or near-real time (e.g., in hours, as opposed to days in the case of joins on tables, or other data structures).

Figure 4:
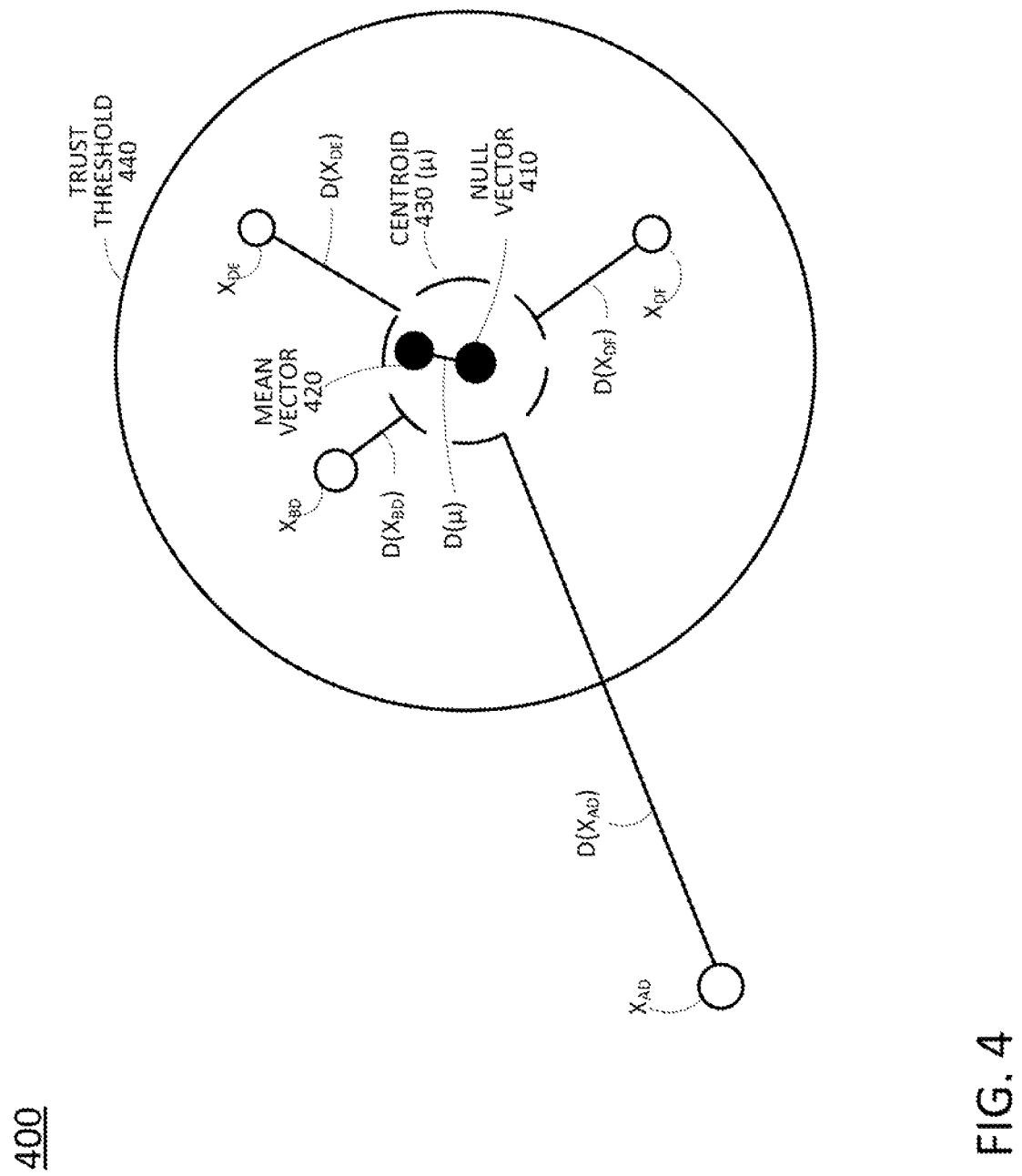
FIG. 4 illustrates an example of a scaled feature space, in accordance with the present disclosure.

FIG. 4 illustrates an example of a scaled feature space 400. It should be noted that the scaled feature space 400 may be presented into two dimensions. However, it should be understood that a scaled feature space may include a single dimension of scaled distance (e.g., a scaled Euclidean distance, or Mahalanobis distance). To illustrate, a relationship may be defined by four or more features for a single communication channel, and hence four or more dimensions in an n-dimensional feature space of X (e.g., a number of calls and total call duration from a first user identity to a second user identity, and a number of calls and total call duration from the second user identity to the first user identity. With features from two communication channels, the number of dimensions may be eight or more. For instance, using calls and text/SMS messages, additional features (and corresponding dimensions) may include a number of messages and total volume of the messages from the first user identity to the second user identity, and a number of messages and total volume of the messages from the second user identity to the first user identity. Still additional or alternative features (and corresponding dimensions in a feature space) may include an average call duration from first user identity to second user identity, an average call duration from the second user identity to the first user identity, an average message size of messages from first user identity to second user identity, an average message size of messages from the second user identity to the first user identity, and so forth. However, all of these features may be reduced to a single dimension of "scaled distance" for purposes of determining a level of "trust."

As shown in FIG. 4, a centroid 430 may be represented in the scaled feature space 400 (denoted by p). The centroid 430 may represent either a null vector 410 where all elements of p are zero, or a mean vector 420, e.g., in which elements of p are calculated mean values of the features associated with the dimensions of an n-dimensional feature space of X. As noted above, it may be assumed that an average or typical relationship in the network is "untrusted" and hence the scaled distance (D(p)) may be close to the null vector (e.g., low or no calls, little or no call duration, few or no text messages, etc.). Thus, for illustrative purposes, the centroid 430 may represent either of the null vector 410 or the mean vector 420.

As further illustrative in FIG. 4, there are four points within the feature space 400: $X_{AD}$, $X_{BD}$, $X_{DE}$, and $X_{DF}$. Each of these points may be associated with a vector of features characterizing a corresponding relationship between user identities (e.g., between A and D, between B and D, between D and E, and between D and F, respectively). It should be noted that each of the vectors may comprise a point within an n-dimensional feature space of X, and may have a Euclidean distance from the centroid 430 within such an n-dimensional space. However, in accordance with the present disclosure, the distances $D(X_{AD})$, $D(X_{BD})$, $D(X_{DE})$, and $D(X_{DF})$ may be calculated as scaled Euclidean distances, e.g., a Mahalanobis distance. For instance, the distances may be according to Equation 1 above, in which the distances are scaled in accordance with a covariance matrix associated with the features of X (and hence the covariance matrix also being associated with the dimensions of the n-dimensional feature space of X). It is again noted that the covariance matrix may be determined from a sample set of vectors associated with a particular user identity (e.g., in the example of FIG. 4 it may be for user identity "D") or may be from a sample set of vectors associated with all user identities associated with a communication network, a sub-segment of user identities, etc.

In one example, the present disclosure may define a trust threshold to distinguish trusted from untrusted relationships (e.g., as visualized by trust threshold 440 in FIG. 4). Notably, the trust threshold 440 may be set fairly high since trusted relationships may be considered outliers. For instance, the trust threshold 440 may be set so as to capture 90% of relationships as "untrusted," 95% of relationships as untrusted, etc. However, it should be noted that in some examples, the present disclosure may only consider relationships in which there are bidirectional communications for use in further calculation of whether the relationship is "trusted" or "untrusted." In addition, in one example, the present disclosure may only consider relationships in which there is a minimum quantity of bidirectional communication for user in further calculation of whether the relationship is "trusted" or "untrusted" (e.g., at least 6 calls within the last 30 days, at least 4 messages within the last 30 days, etc.). Thus, in one example the trust threshold 440 may be selected in consideration of the entirety of associated data that is used for training, mean vector and/or covariance matrix determination, or the like. For instance, when only relationships meeting a minimum requirement are considered for calculating a covariance matrix, the trust threshold 440 may be set lower than if many relationships with lesser numbers of communications are included for consideration. It should also be noted that although a single trust threshold 440 is shown, in other, further, and different examples, additional trust thresholds may be used to differentiate multiple categories of trust (e.g., very high, high, medium, low, very low, etc.).

Figure 5:
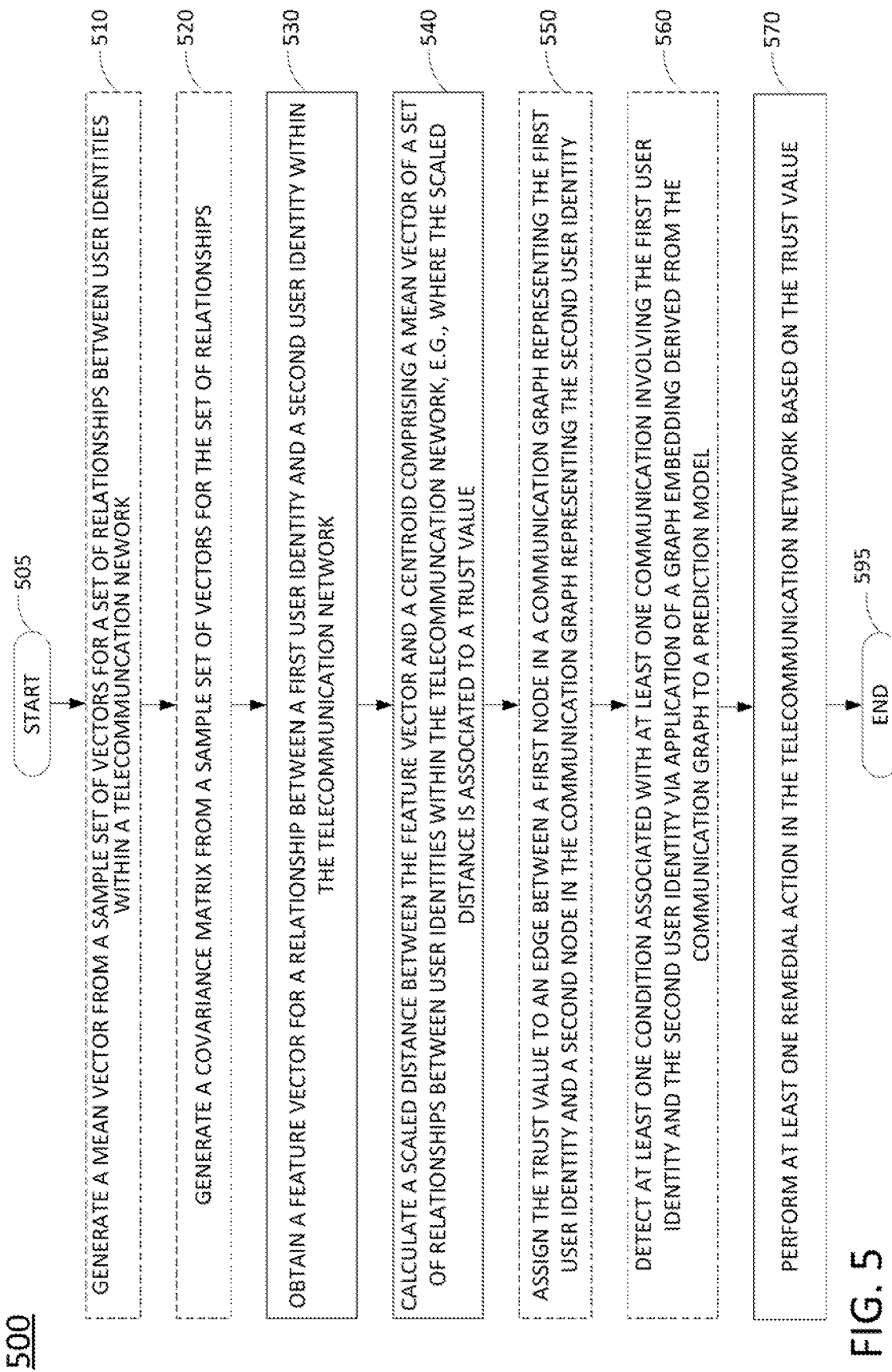
FIG. 5 illustrates a flowchart of an example method for performing at least one one remedial action in a telecommunication network based on a trust value calculated as a scaled distance between a feature vector for a relationship between two user identities and a centroid comprising a mean vector of a set of relationships.

FIG. 5 illustrates an example flowchart of a method 500 for performing at least one remedial action in a telecommunication network based on a trust value calculated as a scaled distance between a feature vector for a relationship between two user identities and a centroid comprising a mean vector of a set of relationships. In one example, steps, functions, and/or operations of the method 500 may be performed by a device as illustrated in FIG. 1, e.g., one of servers 135. Alternatively, or in addition, the steps, functions and/or operations of the method 500 may be performed by a processing system collectively comprising a plurality of devices as illustrated in FIG. 1 such as one or more of server(s) 135, DB(s) 136, endpoint devices 111-113 and/or 121-123, devices 131-134, server(s) 155, and so forth. In one example, the steps, functions, or operations of method 500 may be performed by a computing device or processing system, such as computing system 600 and/or a hardware processor element 602 as described in connection with FIG. 6 below. For instance, the computing system 600 may represent at least a portion of a platform, a server, a system, and so forth, in accordance with the present disclosure. In one example, the steps, functions, or operations of method 500 may be performed by a processing system comprising a plurality of such computing devices as represented by the computing system 600. For illustrative purposes, the method 500 is described in greater detail below in connection with an example performed by a processing system. The method 500 begins in step 505 and may proceed to optional step 510, optional step 520, or step 530.

At optional step 510, the processing system may generate a mean vector from a sample set of vectors for a set of relationships between user identities within a telecommunication network. For instance, each of the vectors may include features associated with a plurality of communication channels. For example, the plurality of communication channels may include voice calls, text messages, email messages, and so forth. In one example, the set of relationships may comprise at least one of: relationships of the first user identity and a first plurality of other user identities, or relationships of the second user identity and a second plurality of other user identities. For instance, in one example, trust of a relationship may be calculated "locally" with respect to a single user identity, or the pair of user identities in a relationship. In one example, optional step 510 may be omitted when a null/zero vector may be used as a mean vector (e.g., an approximated mean vector instead of a mean vector calculated via optional step 510). In one example, the set of vectors may be obtained from edges of a communication graph that includes nodes representing user identities and edges representing relationships between user identities. In one example, the features may include features aggregated over one or more time periods, e.g., 30, 60, and 90 day totals of calls, sum of call durations, text messages, sum of text message sizes, etc.

At optional step 520, the processing system may generate a covariance matrix from a sample set of vectors for the set of relationships. In one example, the sample set may be the same as a sample set that may be used in optional step 510. In another example, a different sample set may be used. For instance, the sample set for optional step 520 may be randomly sampled or can be formed via a weighted sampling (e.g., so as to include more outliers (e.g., known trusted relationships) than random sampling, to include relatively more samples for particular categories or types of user identities than random sampling (e.g., user identities associated with a particular region, user identities associated with a specific device type, etc.), and so forth). Similar to the above, in one example, the set of vectors may be obtained from the edges of a communication graph that includes nodes representing user identities and edges representing relationships between user identities.

At step 530, the processing system obtains a feature vector for a relationship between a first user identity and a second user identity within the telecommunication network. For instance, the feature vector may include at least: a first number of communications from the first user identity to the second user identity for a first communication channel, a first volume associated with the first number of communications from the first user identity to the second user identity, a second number of communications from the second user identity to the first user identity for the first communication channel, and a second volume associated with the second number of communications from the second user identity to the first user identity. For instance, when the first communication channel comprises voice calls, this may include a number of calls and a sum of call duration (e.g., broadly volume) of the number of calls from the first user identity to the second user identity, and vice versa. In one example, the feature vector may further include features of average duration of call (e.g., another "volume" metric), and so forth. Alternatively, when the first communication channel comprises text messages, this may include a number of text messages and a sum of text message lengths of the number of text messages (e.g., another "volume" metric) from the first user identity to the second user identity, and vice versa. In one example, the feature vector may further include features of average text message size, and so forth. As discussed above, the feature vector may include features from a defined time period, such as 30, 60, or 90 day total number of calls, sums of call durations, etc.

In one example, the feature vector may include features associated with a plurality of communication channels, the plurality of communication channels including at least the first communication channel. Accordingly, in one example the feature vector may further include at least: a third number of communications from the first user identity to the second user identity for a second communication channel of the plurality of communication channels, a third volume associated with the third number of communications from the first user identity to the second user identity, a fourth number of communications from the second user identity to the first user identity for the second communication channel, and a fourth volume associated with the fourth number of communications. For instance, for text messages or voice calls, these features may correspond to those mentioned above. For emails, the third number of communications may be a number of emails from the first user identity to the second user identity, the third volume may be a total message size (e.g., in terms of words, characters, data size, or other metrics), and so forth. For instance, the plurality of communication channels may include voice calls, text messages, and/or email messages.

In one example, the plurality of communication channels may alternatively or additionally include Multimedia Messaging Service (MMS) messages, messages via chat applications, video call applications, social network platforms, etc. so long as communications within each channel can be tied to the same user identities across channels. It should also be noted that in one example, the feature vector may be obtained from the edges of a communication graph that includes nodes representing user identities and edges representing relationships between user identities (e.g., the same communication graph that may be associated with the sample set(s) of optional step 510 and/or optional step 520).

In addition, although the terms, "first," "second," "third," etc., may be used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," does not imply a particular number of those items corresponding to those numerical values. In addition, the use of the term "third" for example, does not imply a specific sequence, temporal relationship, or precedence with respect to a "first" and/or a "second" of a particular type of item, unless otherwise indicated.

At step 540, the processing system calculates a scaled distance between the feature vector and a centroid comprising a mean vector of a set of relationships between user identities within the telecommunication network, e.g., where the scaled distance is associated to a trust value. For instance, the scaled distance may comprise a scaled Euclidean distance, e.g., a Mahalanobis distance. In one example, the mean vector may be calculated at optional step 510. In another example, the mean vector may be a zero/null vector. For instance, it may be known or assumed that most relationships in a telecommunication network are zero trust, so trusted relationships are outliers. As such, in one example, a null vector may approximate a representative zero trust relationship. In one example, the scaled distance may be calculated using a covariance matrix. For instance, a covariance matrix may be determined in optional step 520 as described above. To illustrate, step 540 may be performed in accordance with Equation 1 above, e.g., to calculate a Mahalanobis distance using: the feature vector, the centroid/mean vector, and the covariance matrix as inputs. In one example, the scaled distance may be associated to the trust value in accordance with a trust threshold. For instance, in one example the trust value may be a category of either trust/no trust, or high trust/neutral/no trust, or the like (e.g., a distance of 75 and above is trusted, while less than 75 is "untrusted," etc.). In another example, the distance and the trust value may be one and the same. In still another example, the distance may be scaled (e.g., linearly) to derive the trust value (e.g., distances may range from 0 to 100, while the trust value may be between 0 and 1, 0 to 5, 1 to 10, etc.).

At optional step 550, the processing system may assign the trust value to an edge between a first node in the communication graph representing the first user identity and a second node in the communication graph representing the second user identity. For instance, optional step 550 may be performed in an example in which relevant data of communications between user identities is maintained in the communication graph. To illustrate, optional step 550 may add the trust value to the "trust stat" field of an edge record in table 240 of FIG. 2.

At optional step 560, the processing system may detect at least one condition associated with at least one communication involving the first user identity and the second user identity via application of a graph embedding derived from the communication graph to a prediction model. For instance, the at least one communication may be a subsequent communication that occurs after the calculation of the distance at step 540, and after the assigning of the trust value to the edge at optional step 550. In one example, the graph embedding may be in accordance with a graph2vec algorithm or the like. Notably, the graph embedding may include at least the trust value. As such, the trust value may be at least one of the predictors/independent variables of the prediction model.

The prediction model may comprise a machine learning model (MLM) or other prediction model, such as a gradient boosted machine (GBM) or the like, a regression-based prediction model, and so forth. The prediction model may be "trained" or configured in accordance with input data (e.g., training data) to perform a particular service, e.g., to detect whether a user identity (e.g., a phone number) is or is not associated with robocalling activity, to identify/predict whether a particular communication is or is not a robocall, to classify a category or robocaller or type of robocall (e.g., beneficial, benign, malicious, or similar categorizations), to classify a risk/threat level of a robocaller or a particular robocall (e.g., high, medium, low risk), etc., to detect fraud and/or to provide a fraud indicator, or value indicative of a likelihood of fraud, to detect spoofed number calling, and so forth. Accordingly, the prediction model may be trained to predict the at least one condition associated with the at least one communication involving the first user identity and the second user identity, e.g., where the at least one condition may comprise a categorization of at least one of: the first user identity or the second user identity as at least one of: a robocaller, a fraud source, or the like.

For instance, the prediction model may be configured to generate an output comprising a classification/prediction (e.g., a binary classification, a multi-class classification, a score/value indicative of a degree of belonging to a particular class, or one or more classes, and/or a confidence score indicative of the output classification, etc.). The training data may include labeled input data sets, e.g., previously generated vectors/embeddings that may then be labeled with respect to one or more target prediction/classification categories and used as training data for training the prediction model. The labeled input data sets may also include additional features that may be extracted directly from the communication graph, or the communication graph itself (or a portion thereof) as discussed above, and labeled with respect to the one or more target categories. For instance, the graph or a sub-graph thereof may relate to a subject node/user identity and two hops away from the subject node, where the subject node may have a known categorization (such as a known robocaller and hence a labeled input data set for "robocaller").

In one example, optional step 560 may include applying at least a portion of the communication graph to the prediction model as at least one additional input. For instance, the prediction model may be trained to predict whether the first user identity, the second user identity, or both is/are associated with a type of network activity associated with the telecommunication network in accordance with (1) the at least one vector and (2) the at least the portion of the communication graph. In other words, the prediction model may make predictions on graph embedding(s) (e.g., vector(s) generated via the graph embedding process), the graph itself (or at least a portion thereof, e.g., a sub-graph), or both. In one example, the type of network activity may comprise a robocalling activity. In addition, in one example, the prediction model may be configured to output a category associated with the robocalling activity (e.g., high-high to low-low on a risk-volume grid, such as illustrated in FIG. 3, or other categorizations that may be defined, such as non-fraudulent robocalling, fraudulent robocalling, probing robocalling (e.g., probers looking for live numbers for making lists for additional threat activities), spoofed-number robocalling, etc.). In other examples, the type of network activity may comprise spoofing (e.g., non-robocalling related), phishing, SMS phishing (or "smishing"), other social engineering exploits, botnet activity, account fraud (e.g., including attempts at in-person transactions at retail locations of the telecommunication network operator, over-the-phone interactions with personnel of the telecommunication network operator, or the like), and so forth.

At step 570, the processing system performs at least one remedial action in the telecommunication network based on the trust value, where the at least one remedial action is applied with respect to at least one communication involving the first user identity and the second user identity. For instance, the at least one remedial action may comprise at least one of: blocking the at least one communication, labeling a caller or sender of the at least one communication in accordance with the trust score, removing a content item from the at least one communication, or replacing the content item from the at least one communication and so forth. For instance, labeling may include providing the score, or labeling with trust/no trust, or a trust category (e.g., high trust/marginal trust/no trust, red/yellow/green, or the like). Removing of content may include removing images, video, or links from text messages, emails, or other communications via a different communication channel, and so forth. Similarly, replacing the content item(s) may include providing links to the content items with a warning. In one example, the at least one communication may be stored for retrieval by an intended recipient. In such case, the processing system may transmit a notification of the at least one communication along with a warning, where the intended recipient may choose to retrieve the at least one communication from a stored location after consideration of such warning. In one example, the performing of the at least one remedial action is in response to the detecting of the at least one condition at optional step 560.

Following step 570, the method 500 ends in step 595.

It should be noted that method 500 may be expanded to include additional steps, or may be modified to replace steps with different steps, to combine steps, to omit steps, to perform steps in a different order, and so forth. For instance, in one example, the processing system may repeat one or more steps of the method 500, such as steps 510-570 for one or more additional relationships, etc. for the same relationship over additional time periods, and so forth. In one example, optional step 560 may include generating one or more graph embeddings, and applying the one or more graph embeddings to a plurality of prediction models for detecting various conditions (e.g., predicting/classifying different types of network activity and or categories associated there-with), such as a first prediction model for predicting associations with robocalling activities, a second prediction model for predicting associations with SMS botnet activity, e.g., SMS phishing or "smishing," etc.

In one example, the method 500 may include training the prediction model in accordance with a training data set (e.g., groups/sets of input factors for user identities, messages, and/or calls for which labels have been applied). In one example, the method 500 may include retraining the prediction model, e.g., when a detected accuracy falls below a threshold accuracy, when the detected accuracy declines a certain percentage below an accuracy determined when the prediction model was deployed, etc. In one example, the method 500 may include generating the communication graph, e.g., prior to optional step 510. In one example, optional steps 510 and 520 may be performed in a different order or in parallel. In one example, step 570 may alternatively or additionally comprise transmitting a notification to one or more network personnel (e.g., endpoint devices associated with network personnel that may be responsible for allowing or denying an in-person transaction at a retail location (such as obtaining a new endpoint device), network personnel who may be authorized to block or suspend telephone numbers, or the like). In one example, the remedial action may include locking or blocking access to a subscriber account, sending a code for two-factor authentication, sending a text message or email alerting an account owner of suspicious activity indicative of spoofing, account takeover or compromise, or the like, imposing increasing inter-call time gaps, and so on. In other words, in one example, a remedial action may be applied without specific connection to a new communication involving the first and second user identities.

In one example, the remedial action of step 570 may comprise, or an additional step of the method 500 may be included to comprise adding a label to the communication graph indicating the output of the prediction model (e.g., suspected robocaller, high volume-high risk robocaller, high volume-low risk robocaller, suspected live number prober, suspected SMS spammer, etc.). Notably, these labels may be used as additional input factors for various prediction models with respect to other phone numbers or other communications represented in the same or a different communication graph. For instance, for a given phone number, a prediction model may be more likely to classify the phone number as being a robocalling number when the phone number has communications with at least one other phone number that is labeled as a likely robocaller or that is a one hop connection to a labeled likely robocaller (and similarly with regard to other designations for various types of monitored network activities, e.g., malicious/threat activities, or other activities that are not necessarily harmful to other users but which may exceed the terms of use according to a subscriber agreement, etc.). In one example, the method 500 may be expanded or modified to include steps, functions, and/or operations, or other features described above in connection with the example(s) of FIGS. 1-4, or as described elsewhere herein. Thus, these and other modifications are all contemplated within the scope of the present disclosure.

In addition, although not specifically specified, one or more steps, functions, or operations of the method 500 may include a storing, displaying, and/or outputting step as required for a particular application. In other words, any data, records, fields, and/or intermediate results discussed in the method 500 can be stored, displayed and/or outputted either on the device(s) executing the method 500, or to another device or devices, as required for a particular application. Furthermore, steps, blocks, functions, or operations in FIG. 5 that recite a determining operation or involve a decision do not necessarily require that both branches of the determining operation be practiced. In other words, one of the branches of the determining operation can be deemed as an optional step. In addition, one or more steps, blocks, functions, or operations of the above described method 500 may comprise optional steps, or can be combined, separated, and/or performed in a different order from that described above, without departing from the examples of the present disclosure.

Figure 6:
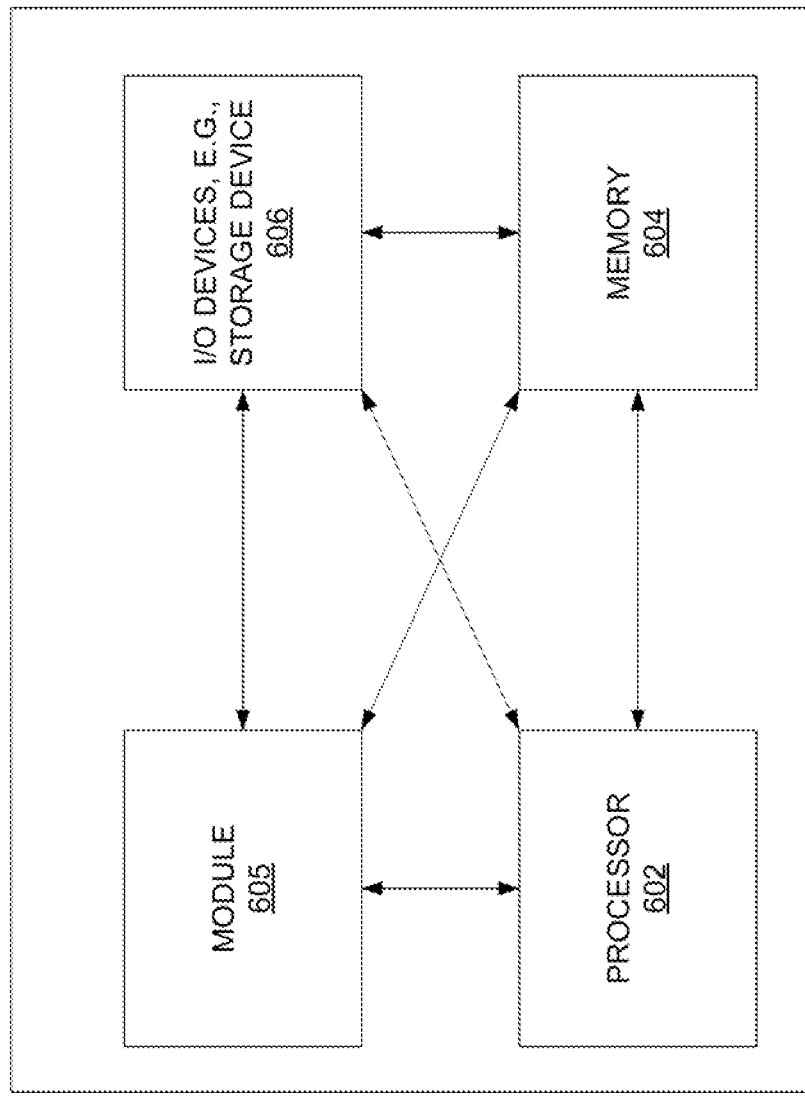
FIG. 6 illustrates a high-level block diagram of a computing device specially programmed to perform the functions described herein.

FIG. 6 depicts a high-level block diagram of a computing system 600 (e.g., a computing device, or processing system) specifically programmed to perform the functions described herein. For example, any one or more components or devices illustrated in FIG. 1, or described in connection with the examples of FIGS. 2-5 may be implemented as the computing system 600. As depicted in FIG. 6, the computing system 600 comprises a hardware processor element 602 (e.g., comprising one or more hardware processors, which may include one or more microprocessor(s), one or more central processing units (CPUs), and/or the like, where hardware processor element may also represent one example of a "processing system" as referred to herein), a memory 604, (e.g., random access memory (RAM), read only memory (ROM), a disk drive, an optical drive, a magnetic drive, and/or a Universal Serial Bus (USB) drive), a module 605 for performing at least one remedial action in a telecommunication network based on a trust value calculated as a scaled distance between a feature vector for a relationship between two user identities and a centroid comprising a mean vector of a set of relationships, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 602 is shown, it should be noted that the computing device may employ a plurality of hardware processor elements. Furthermore, although only one computing device is shown in FIG. 6, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 6 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 602 can also be configured or programmed to cause other devices to perform one or more operations as discussed above. In other words, the hardware processor element 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 605 for performing at least one remedial action in a telecommunication network based on a trust value calculated as a scaled distance between a feature vector for a relationship between two user identities and a centroid comprising a mean vector of a set of relationships (e.g., a software program comprising computer-executable instructions) can be loaded into memory 604 and executed by hardware processor element 602 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for performing at least one remedial action in a telecommunication network based on a trust value calculated as a scaled distance between a feature vector for a relationship between two user identities and a centroid comprising a mean vector of a set of relationships (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system including at least one processor, a feature vector for a relationship between a first user identity and a second user identity within a telecommunication network, wherein the feature vector includes at least: a first number of communications from the first user identity to the second user identity for a first communication channel, a first volume associated with the first number of communications from the first user identity to the second user identity, a second number of communications from the second user identity to the first user identity for the first communication channel, and a second volume associated with the second number of communications from the second user identity to the first user identity, wherein the feature vector includes features associated with a plurality of communication channels, the plurality of communication channels including at least the first communication channel;
    calculating, by the processing system, a scaled distance between the feature vector and a centroid comprising a mean vector of a set of relationships between user identities within the telecommunication network, wherein the scaled distance is associated to a trust value; and
    performing, by the processing system, at least one remedial action in the telecommunication network based on the trust value, wherein the at least one remedial action is applied with respect to at least one communication involving the first user identity and the second user identity.

2. The method of claim 1, wherein the plurality of communication channels includes at least two of: voice calls, text messages, or email messages.

3. The method of claim 1, wherein the feature vector further includes at least: a third number of communications from the first user identity to the second user identity for a second communication channel of the plurality of communication channels, a third volume associated with the third number of communications from the first user identity to the second user identity, a fourth number of communications from the second user identity to the first user identity for the second communication channel, and a fourth volume associated with the fourth number of communications from the second user identity to the first user identity.

4. The method of claim 1, wherein the first communication channel comprises voice calls.

5. The method of claim 4, wherein the first volume comprise a first sum of call durations of the first number of communications, and wherein the second volume comprises a second sum of call durations of the second number of communications.

6. The method of claim 1, wherein the first communication channel comprises text messages.

7. The method of claim 6, wherein the first volume comprises a first sum of text message lengths of the first number of communications, and wherein the second volume comprises a second sum of text message lengths of the second number of communications.

8. The method of claim 1, wherein the scaled distance comprises a scaled Euclidean distance.

9. The method of claim 1, wherein the scaled distance comprises a Mahalanobis distance.

10. The method of claim 1, further comprising:
    generating the mean vector from a sample set of vectors for the set of relationships.

11. The method of claim 10, wherein the set of relationships comprises relationships of at least one of:
    the first user identity and a first plurality of other user identities; or
    the second user identity and a second plurality of other user identities.

12. The method of claim 1, wherein the mean vector comprises a null vector.

13. The method of claim 1, wherein the scaled distance is calculated using a covariance matrix.

14. The method of claim 13, further comprising:
    generating the covariance matrix from a sample set of vectors for the set of relationships.

15. The method of claim 1, wherein the feature vector is obtained from a communication graph that includes nodes representing user identities and edges representing relationships between the user identities, the method further comprising:

assigning a trust value to an edge between a first node in the communication graph representing the first user identity and a second node in the communication graph representing the second user identity.

16. The method of claim 15, further comprising:

detecting at least one condition associated with the at least one communication involving the first user identity and the second user identity via application of a graph embedding derived from the communication graph to a prediction model, wherein the graph embedding includes at least the trust value, and wherein the performing of the at least one remedial action is in response to the detecting of the at least one condition.

17. The method of claim 16, wherein the at least one condition comprises a categorization of at least one of: the first user identity or the second user identity as at least one of; a robocaller or a fraud source.

18. A non-transitory computer-readable medium storing instructions which, when executed by a processing system including at least one processor, cause the processing system to perform operations, the operations comprising:

obtaining a feature vector for a relationship between a first user identity and a second user identity within a telecommunication network, wherein the feature vector includes at least: a first number of communications from the first user identity to the second user identity for a first communication channel, a first volume associated with the first number of communications from the first user identity to the second user identity, a second number of communications from the second user identity to the first user identity for the first communication channel, and a second volume associated with the second number of communications from the second user identity to the first user identity, wherein the feature vector includes features associated with a plurality of communication channels, the plurality of communication channels including at least the first communication channel;

calculating a scaled distance between the feature vector and a centroid comprising a mean vector of a set of relationships between user identities within the telecommunication network, wherein the scaled distance is associated to a trust value; and performing at least one remedial action in the telecommunication network based on the trust value, wherein the at least one remedial action is applied with respect to at least one communication involving the first user identity and the second user identity.

19. An apparatus comprising:

a processing system including at least one processor; and a non-transitory computer-readable medium storing instructions which, when executed by the processing system, cause the processing system to perform operations, the operations comprising:

obtaining a feature vector for a relationship between a first user identity and a second user identity within a telecommunication network, wherein the feature vector includes at least: a first number of communications from the first user identity to the second user identity for a first communication channel, a first volume associated with the first number of communications from the first user identity to the second user identity, a second number of communications from the second user identity to the first user identity for the first communication channel, and a second volume associated with the second number of communications from the second user identity to the first user identity, wherein the feature vector includes features associated with a plurality of communication channels, the plurality of communication channels including at least the first communication channel;

calculating a scaled distance between the feature vector and a centroid comprising a mean vector of a set of relationships between user identities within the telecommunication network, wherein the scaled distance is associated to a trust value; and performing at least one remedial action in the telecommunication network based on the trust value, wherein the at least one remedial action is applied with respect to at least one communication involving the first user identity and the second user identity.

20. The apparatus of claim 19, wherein the plurality of communication channels includes at least two of: voice calls, text messages, or email messages.

* * * * *